United States Patent [19]

Savage et al.

[11] Patent Number: 5,315,881
[45] Date of Patent: May 31, 1994

[54] MAGNETOSTRICTIVE TORQUE SENSOR

[75] Inventors: Howard T. Savage, Greenbelt; Arthur E. Clark, Adelphi; Marilyn Wun-Fogle, Gaithersburg; Lawrence T. Kabacoff, Columbia, all of Md.; Antonio Hernando, Madris, Spain; Bruce Beihoff, Wauwatosa, Wis.

[73] Assignee: The United States of America as represented by the Secretary of the Navy, Washington, D.C.

[21] Appl. No.: 965,329

[22] Filed: Oct. 23, 1992

Related U.S. Application Data

[62] Division of Ser. No. 374,112, Jun. 21, 1989.

[51] Int. Cl.⁵ .................................................. G01L 3/02
[52] U.S. Cl. ........................... 73/862.333; 73/862.325; 324/209
[58] Field of Search ..................... 73/862.333, 862.331, 73/862.334, 862.335, 862.336, 779, DIG. 2; 324/209

[56] References Cited

U.S. PATENT DOCUMENTS 4,763,030 8/1988 Clark et al. ................. 73/862.336 X
4,765,192 8/1988 Hase et al. ...................... 73/862.334

FOREIGN PATENT DOCUMENTS 3081630 4/1991 Japan ............................ 73/862.333

*Primary Examiner*—Donald O. Woodiel
*Assistant Examiner*—Elizabeth L. Dougherty
*Attorney, Agent, or Firm*—John D. Lewis; Jacob Shuster

[57] ABSTRACT

Magnetostrictive wire having a low surface-to-volume ratio established by a constant non-planar cross-section, is helically deformed into contact with a shaft under a stress maintaining the wire in fixed relation to the shaft surface. Magnetic anisotropy is imparted to the wire by twist thereof about its cross-sectional axis while the wire is being helically deformed into contact with the shaft surface to form a torque sensor through which accurate torque detection is achieved.

9 Claims, 2 Drawing Sheets

MAGNETOSTRICTIVE TORQUE SENSOR

BACKGROUND OF THE INVENTION

This invention relates generally to detecting transmission of torque through shafts by use of magnetostrictive material positioned on the surface of such shafts as disclosed in allowed copending application Ser. No. 07/374,112, filed Jun. 21, 1989, which respect to which the present application is a division.

Torque sensors of the aforementioned type are generally well known in the art as disclosed for example in U.S. Pat. Nos. 4,631,796, 4,823,617, 4,765,192 and 4,823,620 to Inomata et al., Hase et al., Hase et al., and Edo et al., respectively. The shaft mounted magnetostrictive means utilized in such torque sensors is in the form of elongated strips or ribbons having a generally planar cross-sectional geometry and made of an amorphous magnetic alloy material, the compositions of which are disclosed, for example, in U.S. Pat. No. 4,763,030 to Clark et al. The magnetostrictive strips are also annealed to remove mechanical strains according to the disclosures in the Inomata et al. and Clark et al. patents.

The referred to prior art torque sensors, as disclosed by way of example in the aforementioned Hase et al. and Edo et al. patents, are formed from magnetostrictive amorphous material wound on the shaft to be measured for torque within two complementary coil sections having helix angles of 45 degrees. Stationary pickup coils disposed in inductive relation to such magnetostrictive coil sections will respectively detect torque applied to the shaft in either direction, in order to measure torque in both directions. In order to obtain accurate measurement of torque, the helically wound, magnetostrictive material must be fixed to the surface of the shaft. Toward that end, such material was bonded by use of suitable adhesives on the cylindrical surface of the shaft or within grooves formed in the shaft according to the aforementioned Hase et al. and Edo et al. patents, for example.

The aforementioned prior art torque sensors were believed to have high figures of merit because of the good transduction properties of the magnetostrictive material based on the use of transverse field annealed amorphous magnetic alloy compositions and establishment of its fixed relationship to the shaft by bonding thereto of generally planar strips or ribbons of such material. However, the bonding of such magnetostrictive strips or ribbons to the external cylindrical surface of the shaft or within grooves formed therein by use of bonding adhesive has created non-homogeneous strains sharply reducing the figure of merit. The application of the magnetostrictive material to the shaft surface by sputtering to avoid the latter problem has been found to be very difficult. Accordingly, the potential of amorphous magnetic alloy materials in providing large values of figure of merit and low hysteresis for torque sensors as aforementioned, has not been satisfactorily exploited.

It is therefore an important object of the present invention to enable full exploitation of the aforementioned properties of amorphous magnetic alloy material for magnetostrictive types of torque sensors so as to avoid use of shaft mounted electronics or moving contacts found to be generally unsatisfactory.

SUMMARY OF THE INVENTION

In accordance with the present invention, the magnetostrictive elements of a torque sensor of the type hereinbefore referred to are positioned on the cylindrical surface of a shaft to detect transmitted torque without any surface modification of the shaft and with minimal contact or use of bonding adhesive to maintain a fixed relationship between the elongated magnetostrictive elements and the external shaft surface. Toward that end, the cross sections of the elongated magnetostrictive elements have a non-planar geometry and a surface-to-volume ratio associated therewith to establish and maintain the requisite fixed relationship to the external shaft surface with minimal contact under the longitudinal stress induced in the magnetostrictive elements as a result of its helical deformation into engagement with the shaft surface. The magnetostricitve elements are accordingly in the form of wire having the requisite non-planar cross-sectional geometry and a surface-to-volume ratio that is significantly less than that of the substantially planar types,-of magnetostrictive strips or ribbons heretofore deemed necessary in accordance with prior art teachings.

The use of a wire type of magnetostrictive element in accordance with the present invention also has the advantage of enabling inductive magnetic anisotropy to be imparted therein while it is being helically wound about the shaft by twisting of the wire about its own longitudinal axis. Further, as a result of the present invention, a relatively modest magnetostrictive property and a relatively small magnetic anisotropy is required to achieve the desired torque detection pursuant to operational principles associated with the aforementioned prior art type of torque sensors. Thus, helical winding of the magnetostrictive wire on the shaft to be measured for torque as a condition induced therein may be accomplished in a rapid and commercially feasible manner by positioning a relatively large volume of magnetostrictive material on the shaft as compared to use of a sputtering process. The magnetostrictive wire may also be annealed, prior to positioning on the shaft, in a magnetic field predominantly directed transverse to the axis of the wire.

These advantages, together with other objects and advantages which will become subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
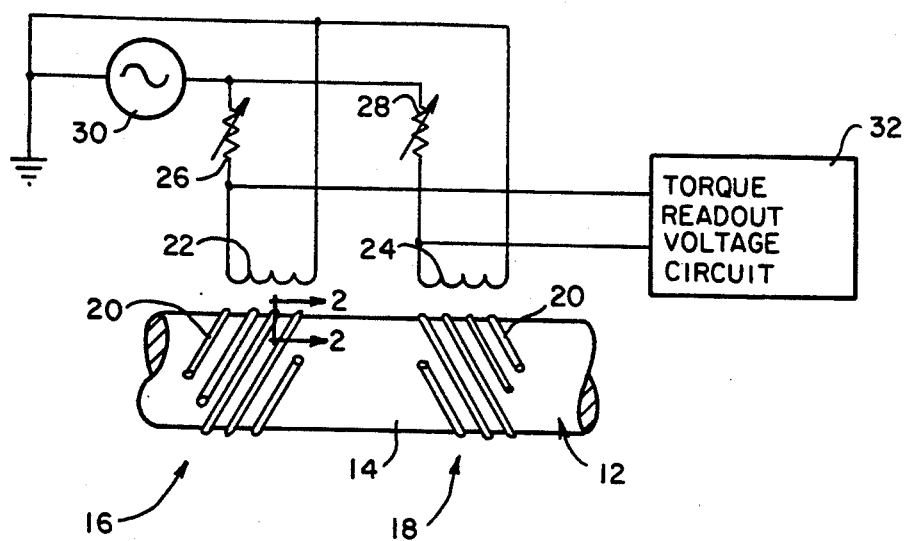
FIG. 1 is a partial side elevation view and an associated electrical circuit diagram for a torque sensor in accordance with one embodiment of the present invention.

Referring now to the drawing in detail, FIG. 1 illustrates a torque sensor constructed in accordance with one embodiment of the present invention, generally referred to by reference numeral 10. The torque sensor is shown associated with a shaft 12 through which torque is to be transmitted, said shaft having an external cylindrical surface 14 that remains unaltered with the torque sensor positioned thereon.

With continued reference to FIG. 1, the torque sensor includes a pair of complementary helically wound coil sections 16 and 18 positioned on the shaft 12 in fixed relationship to its external surface 14 and in axially spaced relationship to each other as shown. In the embodiment illustrated, each coil section is formed by closely spaced, parallel wire elements 20 helically wound at a helix angle of 45 degrees, for example. Inductively associated with each of the coil sections 16 and 18 are stationary pick-up coils 22 and 24. The coils 22 and 24 are respectively connected through adjustable resistors 26 and 28 to a source of oscillating voltage 30. By means of the adjustable resistors 26 and 28, the stationary pick-up coils 22 and 24 may be balanced to obtain a zero differential voltage applied to a torque readout circuit 32 of a type generally known in the art, when no torque is being transmitted.

During installation of the torque sensor, as will be referred to hereinafter, shaft 12 is torqued in opposite directions in order to increase longitudinal tension in the wires 20 of respective coil sections 16 and 18. Accordingly, when the shaft 12 is subsequently torqued after installation of the torque sensor, the longitudinal stresses in the wires 20 of respective coil sections 16 and 18 will vary in opposite directions to produce a differential voltage applied to the torque readout voltage circuit 32.

Figure 2:
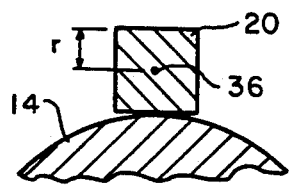
FIG. 2 is an enlarged partial section view taken substantially through a plane indicated by section line 2—2 in FIG. 1.

As shown in FIG. 2, the magnetostrictive wire 20 is geometrically square in cross-section so as to establish a surface-to-volume ratio that is significantly less than that associated with the generally planar strips or ribbons heretofore utilized for the type of torque sensors involved. Because of such cross-section of the wire 20, contact with the external cylindrical surface 14 of the shaft established by helical winding of the wire about the shaft, is minimized. Furthermore, the stress induced in the wire as a result of its helical deformation when being wound onto the shaft is sufficient to substantially maintain the wire fixed to the shaft surface 14. If bonding adhesive is utilized, to ensure the fixed relationship, considerably less bonding adhesive would be needed in view of the minimal contact involved.

In accordance with one embodiment of the invention, the magnetostrictive wire is a commercially available type marketed by the Allied Corporation under the trade name "Unitaka AF-1 and DF-1", involving an iron-boron base composition. Of course, other iron-boron based amorphous alloy materials may be utilized in accordance with the present invention.

Figure 3:
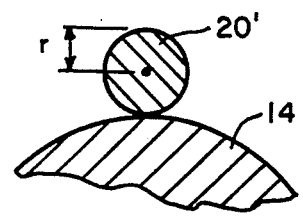
FIGS. 3 and 4 are partial section views similar to that of FIG. 2, showing different embodiments of the invention.
Figure 4:
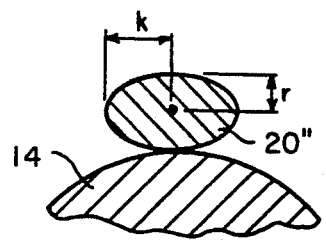

FIG. 3 illustrates another embodiment of the invention in which magnetostrictive wire 20' for the magnetostrictive coil sections, has a circular cross-section. The surface-to-volume ratio associated with such circular cross-section is even less than that of the wire 20 having the square cross-section as shown in FIG. 2. A magnetostrictive wire 20" having an elliptical or oval cross-section as shown in FIG. 4 with a surface-to-volume ratio of a value between the ratios respectively associated with the cross-sections of the wires 20 20' of FIGS. 2 and 3, may also be utilized in accordance with the present invention.

Figure 5:
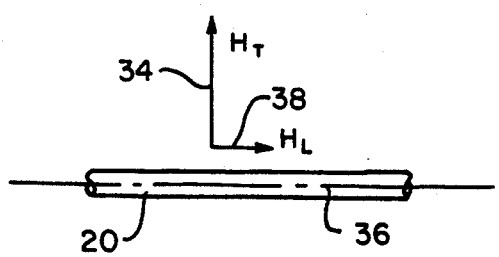
FIG. 5 is a partial side elevation view of a straight segment of an elongated magnetostrictive wire element associated with the torque sensor depicted in FIG. 1.
Figure 6:
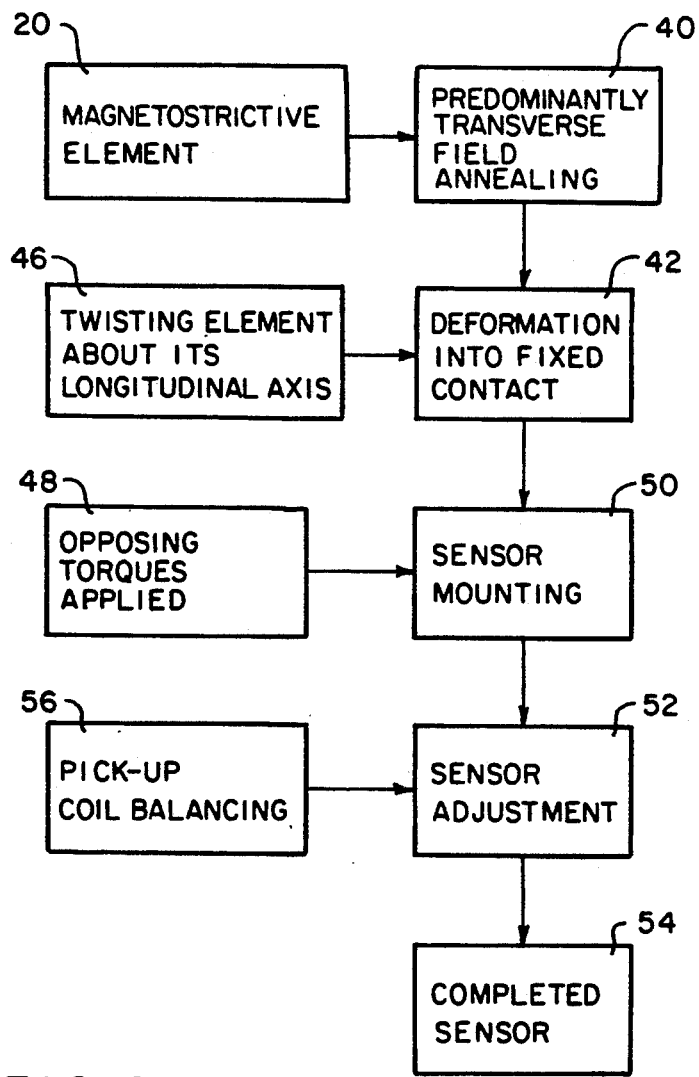
FIG. 6 is a block diagram depicting the method of making the torque sensor in accordance with one embodiment of the present invention.

As diagrammed in FIG. 5 a straight segment of the magnetostrictive wire 20 is magnetically annealed prior to helical deformation or winding in which the directional component 34 of the magnetic field in a direction transverse to the longitudinal axis 36 of the wire predominates over the component 38 of the field in the longitudinal direction. Such annealing of the wire 20 before its helical deformation is diagrammed in FIG. 6 as a step 40 in the making of the torque sensor in accordance with one embodiment of the invention. After the wire is annealed in a field of several thousand oersteds, for example, in the transverse direction, the wire is helically deformed into fixed contact with the external surface 14 of the shaft 12 as indicated by step 42 in the diagram of FIG. 6. During such helical deformation of the wire, it is twisted about its longitudinal axis 36 so as to impart thereto inductive magnetic anisotropy as indicated by the step 46 in FIG. 6. The use of wire as the elongated magnetostrictive element made of the amorphous magnetic alloy material in accordance with the present invention not only establishes a more uniform cross-section of constant area but also enables simultaneous twisting and helical deformation of the magnetostrictive element. The degree of twist of the wire about its own axis 36 will effect the dynamic range and the sensitivity of the torque sensor.

During the winding of each coil section, shaft 12 is torqued in a corresponding direction so as to increase the longitudinal tension in the wire upon removal of such torque. Subsequent application of torque to the shaft in that direction will accordingly increase the longitudinal tension in the wire in one coil section while decreasing the longitudinal tension of the wire in the other coil section. Accordingly, the shaft 12 is momentarily torqued in opposite directions during the mounting of the sensor as denoted by the steps 48 and 50 in FIG. 6. The sensor is adjusted as indicated by step 52 before its completion, as denoted by reference numeral 54, by balancing the pick-up coils 22 and 24 as indicated by step 56 in FIG. 6, involving by way of example, adjustment of the adjustable resistors 26 and 28 as aforementioned in connection with FIG. 1.

As will be appreciated by persons skilled in the art, the dimension of the wire cross-section is a factor in determining demagnetizing effects and corresponding sensitivity of the torque sensor in addition to other factors such as axial spacing between the wire coils of the coil sections. Variation in the amount of active material within the wire will vary the signal-to-noise ratio. Accordingly, depending upon operating conditions, an optimum torque sensor arrangement may be achieved by appropriate selection of the aforementioned dimensional factors.

As aforementioned, the specific composition of the wire may vary as long as an amorphous magnetic material is utilized having a magnetostrictive property. The magnetostriction may be of a relatively modest absolute value above 4 parts per million. The magnetic anisotropy induced in the wires during its helical deformation into fixed contact with the shaft may be relatively small. While field annealing of the wire prior to its helical deformation will substantially increase sensitivity of the torque sensor, it is not absolutely necessary.

The use of a wire as the elongated magnetostrictive element is a significant departure of the present invention from the prior art because of the unexpected benefits achieved as aforementioned, attributable to a relatively lower surface-to-volume ratio associated with the non-planar cross-section of the wire. In connection with the magnetostrictive wire 20 for example, having a geometrically square cross-section, the surface-to-volume ratio is $4/\sqrt{A}$, where A is the area of the square cross-section. A still lower surface-to-volume ratio of $2\sqrt{\pi}\sqrt{A}$ is associated with the circular cross-section of the magnetostrictive wire 20' as illustrated in FIG. 3. A surface-to-volume ratio of a value between those associated with the wires 20 and 20' is established by use of an oval cross-section wire 20" as shown in FIG. 4.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. In a sensor positioned on a surface of a member for measurement purposes, said sensor having an elongated magnetorestrictive element made of an amorphous magnetic material deformed under stress into fixed relation to the member on a contacting portion of said surface thereof, the improvement residing in said element having a non-planar cross-section establishing a surface-to-volume ratio preselected to minimize said contacting portion of said surface of the member during measurement thereof.

2. The improvement as defined in claim 1 wherein said element is a wire, the cross-section of which encloses a substantially constant area limiting the surface-to-volume ratio to less than $4/\sqrt{A}$, where A is equal to said constant area of the cross-section.

3. The improvement as defined in claim 2 wherein said wire has magnetic anisotropy induced therein by said stress.

4. In a sensor positioned on a shaft, the surface of which is cylindrical, to measure torque being transmitted therethrough, said sensor having an elongated magnetorestrictive element made of an amorphous magnetic material deformed into fixed relation to the shaft, the improvement residing in said element having a non-planar cross-section establishing a surface-to-volume ratio under which the element is maintained fixed to a minimized external contact portion of said surface of the shaft during measurement of the torque transmitted therethrough.

5. In a sensor positioned on an external surface of a member, an elongated helical element in fixed contact with said external surface, said element having magnetic anisotropy induced therein, and circuit means inductively positioned in operative relation to the element for measurement of stress induced in the member, said element being a wire having a constant cross-sectional area in fixed contact with the external surface of the member established under a surface-to-volume ratio for said constant cross-sectional area (A) of less than $4\sqrt{A}$.

6. The sensor as defined in claim 5 wherein said circuit means includes a coil through which electrical current is induced as a function of the stress induced in the member.

7. In a sensor positioned on an external surface of a member, an elongated element in fixed contact with said external surface, said element being made of magnetorestrictive material and having a constant cross-sectional area establishing a preselected surface-to-volume ratio, said fixed contact of the element with the external surface of the member being established by stress of the element on a contacting surface portion minimized by said preselected surface-to-volume ratio of the element.

8. The sensor as defined in claim 7 wherein said member is a shaft to which torque is applied.

9. In a sensor positioned on a member, an elongated helical element fixed by stress therein to said member over an external contact surface, said element being made of magnetorestrictive material and having a constant cross-sectional area minimizing said external contact surface under a predetermined surface-to-volume ratio of the element and circuit means inductively coupled to the element for measurement of torque applied to the member.

* * * * *